United States Patent
Pherson et al.

(10) Patent No.: US 7,353,353 B2
(45) Date of Patent: Apr. 1, 2008

(54) FILE SECURITY MANAGEMENT

(75) Inventors: James E. Pherson, Colorado Springs, CO (US); Diana Shen, Colorado Springs, CO (US); Paul D. Guttormson, Colorado Springs, CO (US); Michael Dean Walker, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 11/144,108

(22) Filed: Jun. 3, 2005

(65) Prior Publication Data

US 2005/0223183 A1    Oct. 6, 2005

Related U.S. Application Data

(63) Continuation of application No. 09/761,938, filed on Jan. 17, 2001, now Pat. No. 6,968,463.

(51) Int. Cl.
*G06F 12/14* (2006.01)
*H04K 1/00* (2006.01)
*H04L 9/00* (2006.01)
*G06F 13/14* (2006.01)
*G06F 12/00* (2006.01)
*G06F 11/00* (2006.01)

(52) U.S. Cl. ............ 711/163; 713/182; 711/152; 711/153; 711/114

(58) Field of Classification Search ............ None
See application file for complete search history.

(56) References Cited

U.S. PATENT DOCUMENTS

| | | | |
|---|---|---|---|
| 5,790,828 A * | 8/1998 | Jost | 711/4 |
| 5,923,876 A | 7/1999 | Teague | |
| 6,161,192 A | 12/2000 | Lubbers | |
| 6,170,063 B1 | 1/2001 | Golding | |
| 6,260,120 B1 * | 7/2001 | Blumenau et al. | 711/152 |
| 6,295,578 B1 | 9/2001 | Dimitroff | |
| 6,343,324 B1 * | 1/2002 | Hubis et al. | 709/229 |
| 6,347,358 B1 * | 2/2002 | Kuwata | 711/113 |
| 6,374,336 B1 * | 4/2002 | Peters et al. | 711/167 |
| 6,397,293 B2 | 5/2002 | Shrader | |
| 6,487,636 B1 | 11/2002 | Dolphin | |
| 6,490,122 B1 | 12/2002 | Holmquist | |
| 6,493,656 B1 | 12/2002 | Houston | |
| 6,505,268 B1 | 1/2003 | Schultz | |
| 6,523,749 B2 | 2/2003 | Reasoner | |

(Continued)

*Primary Examiner*—Ayaz Sheikh
*Assistant Examiner*—Arezoo Sherkat

(57) ABSTRACT

A method for implementing security management in a storage area network by controlling access to network resources. Initially, a resource provider communicates with potential resource users, such as host computers, servers, and workstations, to allow the users to discover the resources available on the storage area network. Resource users that have not previously logged in to a particular resource supply identification information to the resource provider, which places the information in a 'not yet approved entity' table. The 'not yet approved entity' table is made available to a management station. An administrator, using the management station, then determines whether to authorize use of resources. If access to the requested resource is allowed, the resource user identification information is stored in an 'approved entity' table. A login is then allowed by the resource user to the selected resource. Once a resource user has initially logged in, connection information is maintained in the 'approved entity' table facilitating subsequent log-in attempts by the resource user.

23 Claims, 6 Drawing Sheets

U.S. PATENT DOCUMENTS

| | | | |
|---|---|---|---|
| 6,546,459 B2 | 4/2003 | Rust | |
| 6,560,673 B2 | 5/2003 | Elliott | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |
| 6,663,003 B2 | 12/2003 | Johnson | |
| 6,681,308 B1 | 1/2004 | Dallmann | |
| 6,684,209 B1 * | 1/2004 | Ito et al. | 707/9 |
| 6,694,413 B1 * | 2/2004 | Mimatsu et al. | 711/162 |
| 6,701,449 B1 * | 3/2004 | Davis et al. | 714/4 |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |
| 6,725,393 B1 | 4/2004 | Pellegrino | |
| 6,742,020 B1 | 5/2004 | Dimitroff | |
| 6,745,207 B2 | 6/2004 | Reuter | |
| 6,763,409 B1 | 7/2004 | Elliott | |
| 6,772,231 B2 | 8/2004 | Reuter | |
| 6,775,790 B2 | 8/2004 | Reuter | |
| 6,795,904 B1 | 9/2004 | Kamvysselis | |
| 6,802,023 B2 | 10/2004 | Oldfield | |
| 6,807,605 B2 | 10/2004 | Umberger | |
| 6,817,522 B2 | 11/2004 | Brignone | |
| 6,823,453 B1 | 11/2004 | Hagerman | |
| 6,839,824 B2 | 1/2005 | Camble | |
| 6,842,833 B1 | 1/2005 | Phillips | |
| 6,845,403 B2 | 1/2005 | Chadalapaka | |
| 7,080,196 B1 * | 7/2006 | Kitamura | 711/114 |
| 7,143,119 B2 * | 11/2006 | Furukawa et al. | 707/202 |
| 2001/0054151 A1 * | 12/2001 | Wheeler et al. | 713/182 |
| 2002/0019863 A1 | 2/2002 | Reuter | |
| 2002/0019908 A1 | 2/2002 | Reuter | |
| 2002/0019920 A1 | 2/2002 | Reuter | |
| 2002/0019922 A1 | 2/2002 | Reuter | |
| 2002/0019923 A1 | 2/2002 | Reuter | |
| 2002/0048284 A1 | 4/2002 | Moulton | |
| 2002/0188800 A1 | 12/2002 | Tomaszewski | |
| 2003/0051109 A1 | 3/2003 | Cochran | |
| 2003/0056038 A1 | 3/2003 | Cochran | |
| 2003/0063134 A1 | 4/2003 | Lord | |
| 2003/0074492 A1 | 4/2003 | Cochran | |
| 2003/0079014 A1 | 4/2003 | Lubbers | |
| 2003/0079074 A1 | 4/2003 | Sicola | |
| 2003/0079082 A1 | 4/2003 | Sicola | |
| 2003/0079083 A1 | 4/2003 | Lubbers | |
| 2003/0079102 A1 | 4/2003 | Lubbers | |
| 2003/0079156 A1 | 4/2003 | Sicola | |
| 2003/0084241 A1 | 5/2003 | Lubbers | |
| 2003/0101318 A1 | 5/2003 | Kaga | |
| 2003/0110237 A1 | 6/2003 | Kitamura | |
| 2003/0126315 A1 | 7/2003 | Tan | |
| 2003/0126347 A1 | 7/2003 | Tan | |
| 2003/0140191 A1 | 7/2003 | McGowen | |
| 2003/0145045 A1 | 7/2003 | Pellegrino | |
| 2003/0145130 A1 | 7/2003 | Schultz | |
| 2003/0170012 A1 | 9/2003 | Cochran | |
| 2003/0177323 A1 | 9/2003 | Popp | |
| 2003/0187847 A1 | 10/2003 | Lubbers | |
| 2003/0187947 A1 | 10/2003 | Lubbers | |
| 2003/0188085 A1 | 10/2003 | Arakawa | |
| 2003/0188114 A1 | 10/2003 | Lubbers | |
| 2003/0188119 A1 | 10/2003 | Lubbers | |
| 2003/0188153 A1 | 10/2003 | Demoff | |
| 2003/0188218 A1 | 10/2003 | Lubbers | |
| 2003/0188229 A1 | 10/2003 | Lubbers | |
| 2003/0188233 A1 | 10/2003 | Lubbers | |
| 2003/0191909 A1 | 10/2003 | Asano | |
| 2003/0191919 A1 | 10/2003 | Sato | |
| 2003/0196023 A1 | 10/2003 | Dickson | |
| 2003/0212781 A1 | 11/2003 | Kaneda | |
| 2003/0229651 A1 | 12/2003 | Mizuno | |
| 2003/0236953 A1 | 12/2003 | Grieff | |
| 2004/0019740 A1 | 1/2004 | Nakayama | |
| 2004/0024838 A1 | 2/2004 | Cochran | |
| 2004/0024961 A1 | 2/2004 | Cochran | |
| 2004/0025546 A1 | 2/2004 | Cochran | |
| 2004/0030727 A1 | 2/2004 | Armangau | |
| 2004/0030846 A1 | 2/2004 | Armangau | |
| 2004/0049634 A1 | 3/2004 | Cochran | |
| 2004/0078638 A1 | 4/2004 | Cochran | |
| 2004/0078641 A1 | 4/2004 | Fleischmann | |
| 2004/0128404 A1 | 7/2004 | Cochran | |
| 2004/0168034 A1 | 8/2004 | Sigeo | |
| 2004/0215602 A1 | 10/2004 | Cioccarelli | |
| 2004/0230859 A1 | 11/2004 | Cochran | |
| 2004/0267959 A1 | 12/2004 | Cochran | |

* cited by examiner

| Entry | Host Port WWN (301) | Host Node WWN (302) | Host Symb. Name (303) | Unit Offset (304) | Pending Unit Attn. (305) | R/W Access (306) | S_ID (307) | Persist. Resv. Info. (308) | LUN Access Map (309) | Host Pref (310) |
|---|---|---|---|---|---|---|---|---|---|---|
| 1 | | | | | | | | | | |
| 2 | | | | | | | | | | |
| ⋮ | | | | | | | | | | |
| 256 | | | | | | | | | | |

Figure 3

| Entry | Host Port WWN (401) | Host Node WWN (402) |
|---|---|---|
| 1 | | |
| 2 | | |
| ⋮ | | |
| 1024 | | |

Figure 4

| Resource Identity | Size | Other Storage Characteristics |
|---|---|---|
| LUN 0 | 512MB | |
| LUN 1 | 33GB | |
| ⋮ | ⋮ | ⋮ |
| LUN N | 122 GB | |

FILE SECURITY MANAGEMENT

RELATED APPLICATIONS

This application is a continuation of U.S. patent application Ser. No. 09/761,938, entitled System for Controlling Access to Resources in a Storage Area Controller, filed Jan. 17, 2001 now U.S. Pat. No. 6,968,463, the disclosure of which is hereby incorporated by reference in its entirety.

BACKGROUND OF THE INVENTION

1. Technical Field

The present invention relates generally to storage area networks, and more particularly, to a method for implementing security management in a storage area network by controlling access to network resources.

2. Statement of the Problem

A storage area network (SAN) is a dedicated, centrally managed, information infrastructure, which enables interconnection of compute nodes and storage nodes. A storage area network facilitates universal access and sharing of storage resources. SANs are presently being integrated into distributed network environments using Fibre Channel technology (described below). Typically, a SAN utilizes a block-oriented protocol for providing storage to compute nodes, while general purpose networks (GPNs), including local area networks (LANs), wide area networks (WANs) and the Internet, typically implement file-oriented protocols. Storage area networks also differ from general purpose networks in that SANs carry large amounts of data with low latency, and historically have lacked a mechanism for implementing security across the network.

Storage area networks presently typically provide an 'everyone (on the network) is trusted' security model because, prior to the availability of Fibre Channel, SANs had a distance limitation on the order of tens of meters. Therefore, compute node operating system (O/S) behavior in existing storage area networks has been in accordance with the distance constraint, i.e., there has been little relatively storage resource sharing among different compute node and each compute node often has dedicated data storage.

Compute nodes on SANs are often also server nodes of a GPN. In these networked systems, the SAN is often implemented with separate, high-speed, network hardware from that of the GPN so as to offload the data from the GPN, thereby increasing GPN and effective CPU performance. Such separation is often desirable because effective compute node CPU performance is often limited by the available bandwidth between compute and storage nodes, and because the bandwidth required between compute and storage nodes often far exceeds all other network traffic affecting the same compute nodes.

Development of storage area networks has been motivated by the need to manage and share the dramatically increasing volume of business data, and to mitigate its effect on GPN performance. Using Fibre Channel connections, SANs can provide high-speed compute node to/from storage node, and storage node to storage node, communications at distances that allow remote workstation and server compute nodes to easily access large shared data storage pools.

Using SAN technology, management of storage systems can be more easily centralized than with alternative technologies, and data backup is facilitated. Both factors act to increase overall system efficiency. The large distances allowed by Fibre Channel SAN technology make it easier to deploy remote disaster recovery sites than with prior technology.

A Fibre Channel SAN can be local, or can now be extended over large geographic distances. The SAN can be viewed as an extension to the storage bus concept that enables storage devices and servers to be interconnected using similar elements as in local area networks (LANs) and wide area networks (WANs): routers, hubs, switches and gateways.

Fibre Channel is presently considered to be the architecture on which most future SAN implementations will be built. Fibre Channel is a technology standard that allows data to be transferred from one network node to another at very high speeds. This standard is backed by a consortium of industry vendors and has been accredited by the American National Standards Institute (ANSI). The word Fibre in Fibre Channel is spelled differently than "fiber" to indicate that the interconnections between nodes are not necessarily based on fiber optics, but can also use copper cables. Fibre Channel is, in essence, a high performance serial link supporting its own, as well as higher level protocols such as the FDDI, SCSI, HIPPI and IPI. SAN configurations may incorporate the FIG. 5 protocol encapsualted within Fibre Channel frames.

Data integrity is an important issue in storage area network technology, since multiple compute nodes employing diverse types of operating systems could coexist within the SAN, and some operating systems do not gracefully share access to the same storage devices with other operating systems. Some operating systems do not even gracefully share access to storage devices among multiple compute nodes even if each node runs the same O/S. Because of this, conflicts can occur that can have damaging results. These conflicts may include file and record lock conflicts, overwrites of home blocks on previously initialized disks, reservations taken out on disks which a compute node should not have access to, improper reformatting, overwriting of files, or other maloperation.

Presently, many current SAN implementations rely on limits on access to the physical wiring for security purposes. As SANs become larger and more geographically dispersed, a security scheme is required which will provide SAN-wide security in order to prevent conflicts over the entire network.

One security mechanism presently being implemented is a partitioning approach called 'zoning', or effectively partitioning at the 'wire' level of the SAN. Various levels of 'zoning' may be used to restrict the any-to-any access by limiting compute node attachment to specific storage nodes. Zoning is often implemented in Fibre Channel switches, such as those available from Brocade Communications Systems, Inc. These switches can be programmed to filter Fibre Channel frames according to their source and destination identifiers, thereby restricting SAN communications to those among authorized nodes and node pairs. Multiple such switches may be incorporated into a switched fabric that appears to each node as a larger, potentially geographically dispersed, switch.

It is known that storage nodes of a SAN could be RAID (Redundant Array of Independent Disks) controllers. RAID controllers are also known as array controllers since they are typically operable to present storage to a SAN with or without operating in redundancy modes. The RAID controllers could be configured to serve multiple logical units of storage. Each logical unit may represent a physical disk or tape drive, or be formed from part of one, all of one, or a combination of several, disk drives with or without redundancy. Each logical unit is a storage resource intended for use by a set of one or more compute nodes, where the sets of intended compute nodes for each logical unit may differ. Zoning as currently implemented typically restricts communications on a node basis, not a logical unit basis.

Resource providers of a SAN include storage nodes as well as any other node configured to provide resources to the SAN. Similarly, resource users of a SAN include compute nodes as well as any other node configured to use resources available on the SAN. For example, but not by way of limitation, a storage node having a data backup device and a disk device can be simultaneously both a resource provider—providing disk LUNs to the SAN—and a resource user—accessing disk resources of other storage nodes to backup data. Similarly, a storage node having disk devices could be a resource provider—providing disk LUNs to the SAN—and a resource user—transmitting data changes to a second resource provider to maintain a mirrored dataset.

Therefore, security and access control needs to be improved to guarantee data integrity by preventing conflicts. It is also desirable that the security and access controls be capable of management from a single network management point. The Fibre Channel specification does not include a specific mechanism for managing security-related issues, and there is presently no commonly available solution to the above-described problems of providing secure access to shared SAN resources.

Solution to the Problem

The present invention overcomes the aforementioned problems of the prior art and achieves an advance in the field by providing a method for controlling and managing resources on storage area networks (SANs). The method is applicable to a wide range of storage area networks, including large scale storage area networks.

The present system provides a table-driven mechanism whereby resources at the LUN level on the SAN can be allocated to specific resource users. Unless authorized to do so, a compute node or other resource user on the SAN is not allowed to access a particular resource.

Two tables are maintained at each resource provider to control storage resources. These include a table for 'approved' storage users (identified by port WWN and node WWN) and the approved resources (typically logical units, or LUNs) to which they have been granted access, and one for 'not-yet-approved' storage users (identified by port WWN and node WWN) that can see, but have not been granted resource access approval by, the resource provider. The table of approved storage resource users may be stored in non-volatile memory of each storage RAID controller so that only initial setup of the table is required. If the table of approved hosts/resources is stored in non-volatile memory, the information therein is available after any event that would require a resource user to re-poll for resources, such as a re-boot operation. The table of 'not-yet-approved' resource users is provided to allow a system administrator to copy information therefrom to the 'approved' table rather than having to enter the information by hand. This 'not-yet-approved' table may, but need not, be stored in volatile memory, which is often less expensive than non-volatile memory.

To facilitate operation of the present system, a SAN management interface is made available to a system manager. The use of the SAN management interface is password protected by the use of known network protocols and standards. At this management interface, the system manager creates or adds to the 'approved' table of each resource provider, matching resource users with access to specific LUNs. Once permission has been granted, information maintained in the 'approved' table facilitates subsequent access by the specified resource user or users.

BRIEF DESCRIPTION OF THE DRAWINGS

FIG. 3 is a diagram showing exemplary contents of the 'approved' table; and

FIG. 4 is a diagram showing exemplary contents of the 'not-yet-approved' table.

DETAILED DESCRIPTION OF THE EMBODIMENTS

Figure 1:
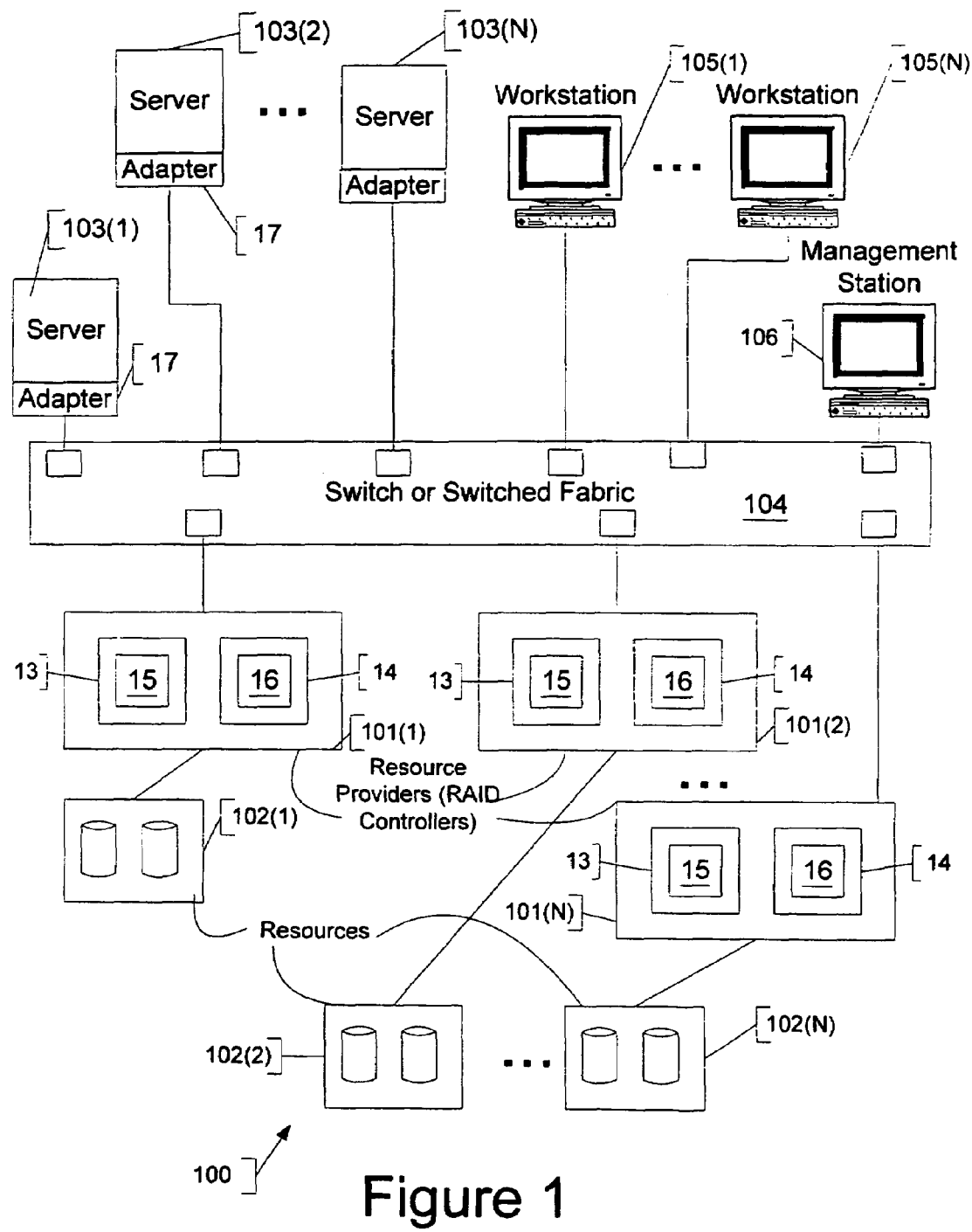
FIG. 1 is a diagram showing the present system in the context of a storage area network.

An embodiment of the present system 100 (FIG. 1) is illustrated in the context of an exemplary storage area network (SAN). The storage area network includes a switch 104 which interconnects a plurality of resource providers, here RAID controllers 101 (shown as controllers 101(1)-101(n) in FIG. 1) with a plurality of resource users, here compute nodes including servers 103 and workstations 105. A typical storage area network uses Fibre Channel technology for intercommunication between the entities connected to the network.

In the exemplary embodiment of FIG. 1, each compute node, such as host processor (or server) 103, workstation 105, or other resource user (hereinafter collectively referred to as "host 103/105") is coupled to Fibre Channel switch 104 via an adapter 17, appropriate cabling, and other network components. Switch 104 may also be a switched fabric, comprising multiple switches in communication with each other. Also connected into the SAN is management station 106, which comprises a processor, associated memory, an input device, and a display device. Management station 106 (described in detail below) provides the capability to manually enter configuration data into a given RAID controller 101(*) in a secure manner [the asterisk following a reference number is a 'wild card' character indicative of any one of the entities having the associated reference number].

Each RAID controller 101 is connected to a disk array 102 containing a plurality of disk storage devices. Each RAID controller 101 contains volatile memory (e.g., RAM) 13 and non-volatile memory 14. Volatile memory 13 in each controller 101 contains a table 15, the 'not-yet-approved entity table') in which is stored SAN hosts 103/105 that presently do not have any 'approved' resources. Non-volatile memory 14 in each controller 101 contains an 'approved entity' table 16 in which is stored:
(1) SAN entities with 'approved' resources,
(2) a list of those resources, and
(3) other host 103/105 configuration information.

The function of each of these tables 15/16 is described in detail below. The term "resources", as used herein, refers to data storage devices such as magnetic or optical disk and tape drives, and may for some devices refer more specifically to data storage areas, such as logical units (LUNs) such as may exist on disk storage devices in a disk array 102.

Figure 2:
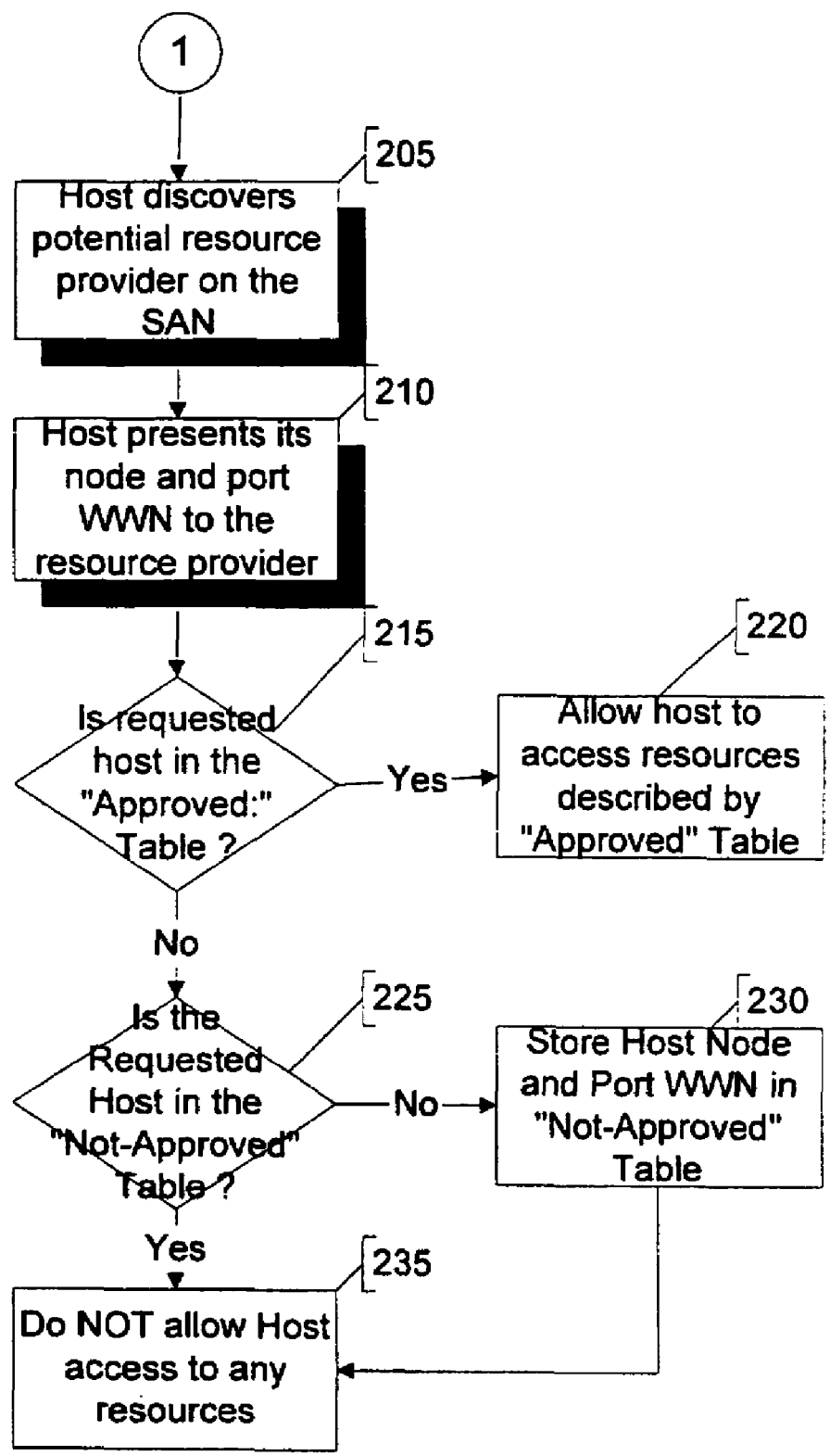
FIG. 2 is a flowchart illustrating, at a high level, steps which may be performed when a host attempts to access a resource provider.

FIG. 2 is a flowchart illustrating, at a high level, steps which may be performed in practicing one embodiment of the method of the present invention. As shown in FIG. 2, at step 205, a resource user, such as a host computer or server 103, or a workstation 105, 'discovers' a potential resource provider 101 on the storage area network, in response to notification that the particular resource is available on the SAN. There are a number of possible ways in which resources can be discovered; for example, a host adapter 17 may poll switch 104, or the host 103/105 may subscribe to a service that provides notification through switch 104 of new resources (i.e., disk storage arrays) 101 that become available on the SAN. In the presently-described embodiment, potential resource users (hosts) 103/105(*) initiate communication to a resource provider (an RAID controller) 101 to discover what resources are available.

At step 210, a host 103/105(*) logs-in to the controller 101 and presents its node WWN (World-Wide Name, a unique identifier) and port WWN to the discovered RAID controller 101. In doing so, the host 103/105(*) provides the source identifier S_ID that will identify communications from that host. RAID controller 101 or other resource provider examines the 'approved entity' table 16 in the controller's non-volatile memory 14, at step 215, to determine whether resources 102(*) are available to the requesting host 103/105(*). The verification made at step 215 includes verifying that the node WWN and port WWN supplied by host 103/105 match corresponding entries in the 'approved entity' table 16, described in detail below. Alternatively, this verification may include only checking either the node or port WWN, or verifying other host identification information previously established and stored in table 16.

If authorized, the host may then send commands to the resource. For every command sent, the host provides a source identification (S_ID) that identifies frames associated with that host.

Exemplary contents of the 'approved entity' table 16 are illustrated in FIG. 3. As shown in FIG. 3, the 'approved entity' table 16 contains information indicative of the specific resources 102 allocated to each resource user (host) 103/105. It is advantageous to store 'approved entity' table 16 in non-volatile memory so that it need not be set up repeatedly and remains intact after events, such as power failure, RAID controller re-boot, etc., that would cause resource users 103/105 to re-poll for resources. Approved entity table 16 makes RAID controller resources 102 accessible to resources consumers 103/105 by providing information such as that included in the following fields indicated by the reference number appearing in FIG. 3.:

301 Host port WWN;
302 Host Node WWN;
303 Host symbolic name;
304 Unit offset_host_relative address of presented LUN resource;
305 Pending unit attentions_information about the state of the storage that is held until the host issues a command to a given device;
307 S_ID an identifier on commands indicating the source host application. While not necessarily unique throughout the world to the host like the WWN, S_ID is typically unique to the host within the SAN;
308 Persistent Reserve Information_a SCSI standard host support mechanism that allows hosts to manage locking and resource allocation dynamically;
309 LUN access map_indicates which LUNs this host (port WWN and node WWN) has access to; and
310 Host Mode$_{13}$ controller tailors specific behaviors to what the host is looking for; for example, this field might indicate that this is an NT host, or an IBM host.

Fields 301-310 (listed above) are entered into 'approved entity' table 16 in step 245, described below. In an exemplary embodiment of the present system, 'approved entity' table 16 may contain up to 256 entries, each of which is slightly larger than 4K bytes, primarily due to the size of Persistent Reserve Information field 308, which is itself a 4K byte length field. In this embodiment, approximately 1 MB of non-volatile memory is required to contain 256 entries. It is anticipated that other embodiments may permit the table to contain other maximum numbers of entries, including numbers of entries greater than 256.

When a host 103/105 presents its node WWN and port WWN to the resource provider or RAID controller 101, the resource provider checks its 'approved entity' table 16 in the controller's non-volatile memory. If, at step 215, the host port WWN and node WWN are listed in table 16, then at step 220, resource provider 101 returns the LUN access map 309 for the entry to the host. LUN access map 309 indicates which resources 102 managed by resource provider (RAID controller) 101 are to be made accessible to a given host 103/105, and therefore, only a single entry in table 16 is required for access to multiple resources by a single host.

Figures 5, 6:
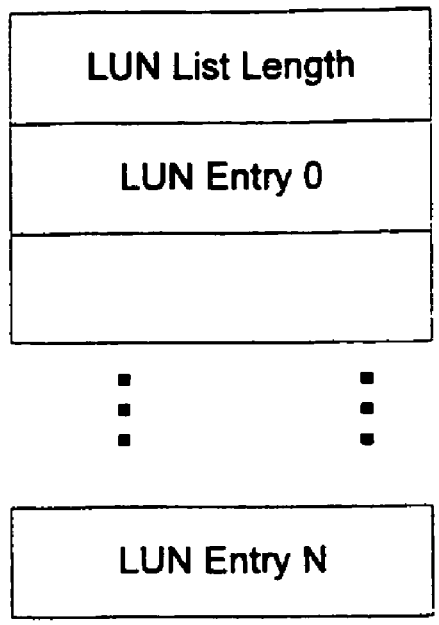
FIG. 5 is a diagram showing exemplary contents of the Report LUNs command when a RAID controller or other resource provider informs a host 103/105 of the resources that it may access. This is a more detailed description of the access map of FIG. 3 item 309.
FIG. 6 is a diagram showing exemplary contents of the table returned by the controller to the management interface describing the available storage.

The LUN access map 309 is provided to the host through a SCSI "Report LUNs" command embedded in fibre channel frames. The response to this command is formatted according to FIG. 5, and reports those LUNs allocated to that host. LUNs not yet allocated to that host are not presented to it.

If, at step 215, it is determined that the requested connection is not stored in the 'approved entity' table 16, then at step 225, the Host port WWN and Host Node WWN from the log-in request is placed in the 'not-yet-approved entity' table 15 and no resources are provided.

It is anticipated that the presently described embodiment may be operable with or without zoning implemented in the switch or switched fabric 104. In the event that zoning is not implemented, the 'not-yet-approved' table of each resource provider will tend to acquire entries corresponding to all resource users, or hosts, in the SAN. In the event that zoning is implemented, the 'not-yet-approved' table of each resource provider will tend to acquire entries corresponding to all resource users, or hosts, in the SAN that have been zoned such that they can communicate with that resource provider.

FIG. 4 is a diagram showing exemplary contents of the 'not-yet-approved entity' table 15. As shown in FIG. 4, each entry in table 15 contains two or more fields, Host port WWN 401 and Host Node WWN 402. In an exemplary embodiment of the present system, 'not-yet-approved entity' table 15 may contain up to 1024 entries, or large enough to store the WWN information for every resource in the SAN. In this embodiment, each of the entries 401/402 in table 15 is 8 bytes in length, yielding a total size of approximately 16

K bytes. It is anticipated that other embodiments may permit larger numbers of entries, and that additional information, such as a symbolic host name 404, may optionally be stored in this table. The entries in 'not-yet-approved entity' table 15 make it easier for management station 106 user to create the 'approved entity' table 16 (described in step 245, below). Table 15 is stored in volatile memory, since it does not need to be preserved across power failures or re-boots by the associated RAID controller 101.

Figure 2A:
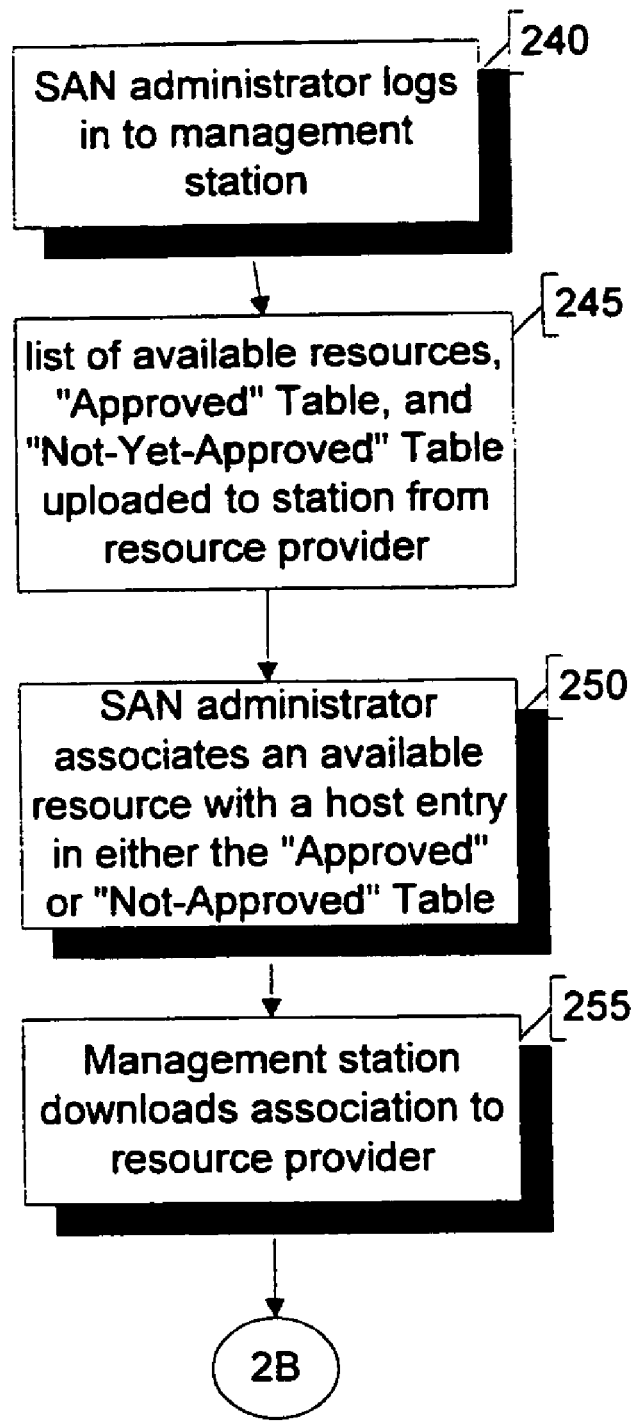
FIG. 2A is a flowchart illustrating, at a high level, steps which may be performed when an administrator reconfigures the system to change an 'approved entity' table.
Figure 2B:
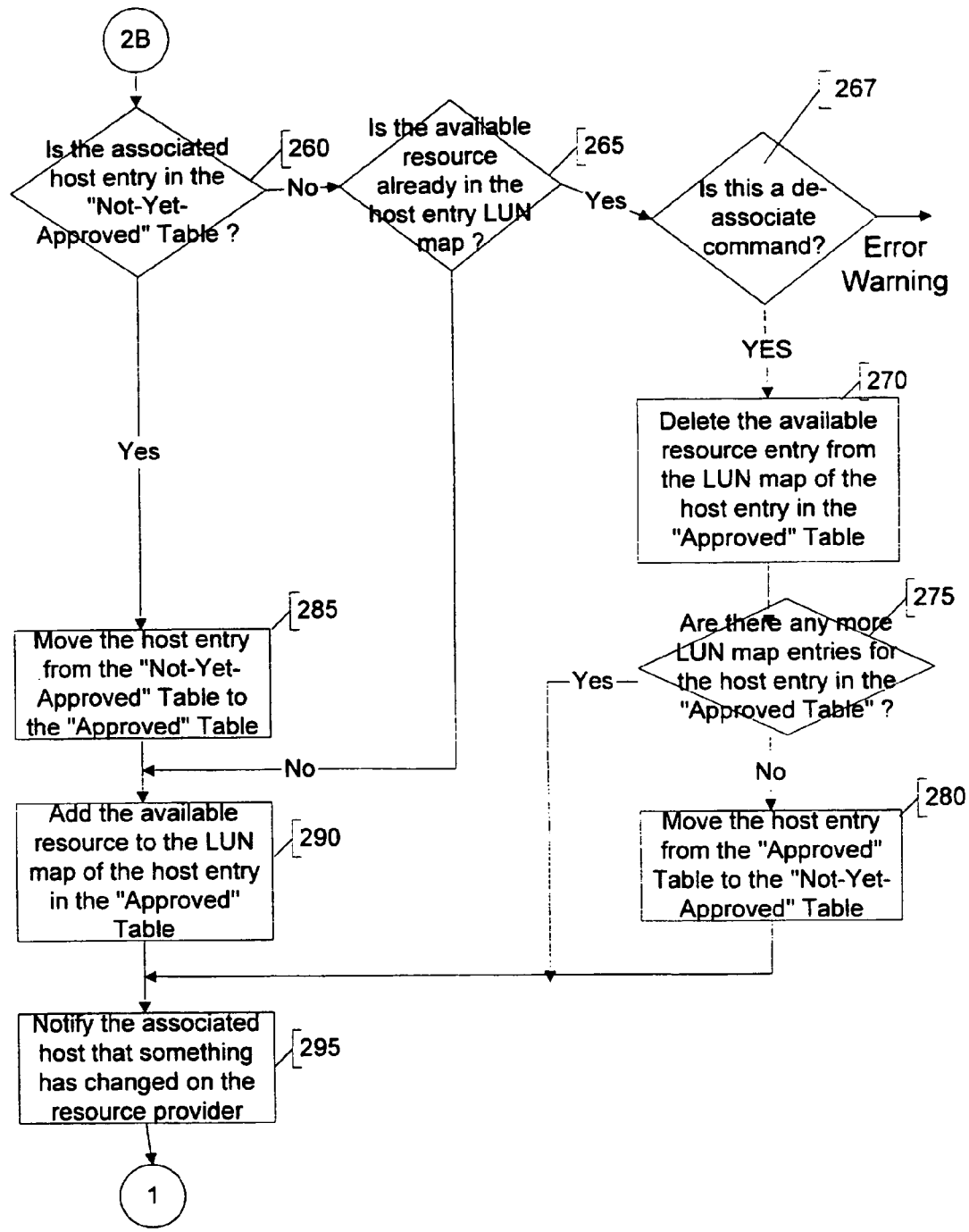
FIG. 2B is a flowchart illustrating, at a high level, steps which may be performed when an administrator reconfigures the system to change an 'approved entity' table.

In order to allocate resources to a host 103/105 (as identified by port WWN and node WWN), a system manager or SAN administrator logs in 240 (FIG. 2A) to management station 106 and selects a resource provider, here RAID controller 101(1) to be managed. Login to the management server 106, and from the management server to the selected RAID controller 101(1), are password protected to prevent unauthorized or accidental changes to resource allocations.

A list (FIG. 6) of available resources 102, the 'approved entity' table 16, and the 'not-yet-approved' entity table 15 are transmitted from RAID controller 101(1) to the management station 106. A management client of management station 106 formats and displays information from the tables and the list of available resources. After viewing the available resources, the administrator selects a host by selecting a port WWN, a node WWN, or a symbolic hostname from either the table 'not-yet-approved entity' 15 or the 'approved entity' table 16. Selection of a host from either table may be accomplished through a mouse-click or other selection method.

Once the administrator has selected a host, the administrator then selects, from the list of available resources, the available resource or resources to be made available to, or remove from availability to, the selected host. As the administrator makes selections indicating desired changes, a record of the desired changes is made in memory of the management station 106.

Management station 106 then conveys the record of the desired changes to RAID controller 101(1) in a secure manner. RAID controller 101(1) in turn, then performs the following actions to update the 'approved entity' table as per the desired updates. For example, updating the 'approved entity' table 16 to allow access to an additional resource may involve the steps (1) if the designated port WWN and node WWN combination appears in 'not-yet-approved entity' table 15 then
 (a) remove it and create a new entry in table 16;
 (b) identify the new entry with port WWN and node WWN; and
 (c) create a LUN access map 309 and initialize remaining fields of the table;
(2) else, if port WWN and node WWN already appears in 'approved entity' table 16, then add the designated LUN to the LUN access map 309.

At step 240 (FIG. 2A), the SAN administrator logs into the management station 106 using a standard LAN/WAN password. This may be performed directly at the management station or over a separate TCP/IP or other GPN network interface that has proven security features. The purpose, in this case is to present new storage resources to a new host or allocate more resources to an established (in table 16) host. The administrator then designates a particular RAID controller 101(1) to undergo allocation changes.

At step 245, the management station 106 requests the current 'approved entity' table 16, as well as the 'not yet approved entity' table 15 and a resource list, which are returned by the selected RAID controller 101(1). At the management station 106 the SAN administrator is able to view the list of current resources FIG. 6 and then associates an available resource with a host at step 250. The management station 106 then transmits 255 the association to the resource provider. The management station 106 may be used additionally to configure host preferences 310, R/W access 306, and unit offset information 304, and, optionally, host symbolic name 303.

Upon receiving the association, the RAID controller 101 checks 260 the host entry in its 'not-yet-approved entity' table 15. If it is not found in this table, a check is performed to see if the designated host is already present in the 'approved entity' table 16; if it is not present it is added by moving 285 the associated entry from the 'not yet approved' table 15 to the 'approved entity' table 16.

If the designated host was already present in the 'approved entity' table 16, a check is made 265 to determine if the designated resource is already associated with the host in the 'approved entity' table. If so, a further check 267 is made to verify that the administrator is de-associating the resource, and an warning is issued if not. De-association, or release of resources, is performed by deleting 270 the available resource entry from the LUN map of the host entry. If 275 there are no more active LUNs in the LUN map for that host entry the host entry is moved 280 from the 'approved entity' table to the 'not-yet-approved entity' table.

When adding an association between a host and a resource, the resource identification is added 290 to the LUN map of the host entry in the 'approved entity' table 16.

The selected resource provider 101 saves the altered 'approved entity' table in NV memory 14 in the selected RAID controller 101(1); and the altered 'not-yet-approved entity' table in volatile memory. Finally, the RAID controller 101(1) notifies 295 the indicated host that the RAID controller may have changed its resources.

Finally, at step 295, when a change in resources is presented to a given host 103/105(*) by RAID controller 101(*), host discovery of SAN resources is initiated, so that hosts 103/105 may be made aware of the available resources 102 on the storage area network.

Once one or more hosts has discovered and has been granted access to resources, following frames attempting to read or write resources are filtered to eliminate those that come from hosts that have not logged-in to the resources. For example, any frame attempting to read or write a resource that has a source identification (S_ID) not associated with a host in the 'approved entity' table will be rejected.

A system for selectively presenting logical units (LUNs) to host computing systems, disclosed in co-pending U.S. Patent Application entitled "System and Method for Selectively Presenting Logical Storage Units to Multiple Host Operating Systems in a Networked Computing System", Ser. No. 09/312,944, filed May 17, 1999 (the '944 patent application), is incorporated herein by reference. The system disclosed therein includes an RAID controller or other resource provider 101 for controlling and coordinating the operations of persistent storage devices 102; a memory 14 accessible by the RAID controller; and a configuration table (not shown in FIG. 1), stored in the memory 14, containing entries governing the interactions between the storage devices 102 and the one or more host computing systems 103/105. The configuration table stores information relating to the host connection through which a particular logical unit on a storage device 102 should communicate; any LUN number offsets employed by the logical unit to communicate with a particular host 105/105; and any special "host modes" (see table 16, field 310) employed by an RAID controller 101 in communicating with a particular host. It is to be noted that the '944 patent application discloses neither a table, nor management station 106 with password protection. Furthermore, by default, in the system disclosed in the '944 patent application, all resources are shown to any host that logs in; thus there is no mechanism disclosed for preventing any host from logging in to any resource on the network.

While preferred embodiments of the present invention have been shown in the drawings and described above, it will be apparent to one skilled in the art that various embodiments of the present invention are possible. For example, the specific configuration of tables 15 and 16 as well as the particular entities in the storage area network described above should not be construed as limited to the specific embodiments described herein. Modification may be made to these and other specific elements of the invention without departing from its spirit and scope as expressed in the following claims.

We claim:

1. A method, comprising:
   receiving, in a storage controller, a resource access request from a resource user;
   granting the resource user access to one or more resources managed by the storage controller when an identifier associated with the resource user is in a table of approved entities;
   storing the identifier associated with the resource user in a table of not-yet-approved entities when the identifier associated with the resource user is not in a table of approved entities;
   transmitting information from the table of not-yet-approved entities to a user interface;
   receiving, at the storage controller, at least one association between a resource managed by the storage controller and a resource user; and
   updating at least one of the table of approved entities or the table of not-yet-approved entities to reflect the received association, wherein undating at least one of the table of approved entities or the table of not-yet-approved entities to reflect the received association comprises:
   removing an entry from the table of not-yet approved entities; and
   creating an entry in the table of approved entities.

2. The method of claim 1, wherein receiving, in a storage controller, a resource access request from a resource user comprise receiving a unique identifier associated with the resource user.

3. The method of claim 2, wherein:
   the resource access request includes an identifier associated with a specific resource managed by the storage controller; and
   granting the resource user access to one or more resources managed by the storage controller when an identifier associated with the resource user is in a table of approved entities comprises searching a table of approved entities for an entry that matches the unique identifier associated with the resource user and includes the identifier associated with a specific resource managed by the storage controller.

4. The method of claim 1, wherein granting the resource user access to one or more resources managed by the storage controller when an identifier associated with the resource user is in a table of approved entities comprises returning a LUN access map to the resource user.

5. The method of claim 1, wherein the table of not-yet-approved entities is stored in volatile memory.

6. The method of claim 1, wherein transmitting information from the table of not-yet-approved entities to a user interface comprises:
   transmitting the information from the table of not-yet-approved entities to a management station; and
   presenting information from the table of not-yet-approved entities on a user interface managed by the management station.

7. The method of claim 6, wherein receiving, at the storage controller, at least one association between a resource managed by the storage controller and a resource user comprises receiving a record of changes to the information from the table of not-yet-approved entities.

8. The method of claim 1, wherein updating at least one of the table of approved entities or the table of not-yet-approved entities to reflect the received association comprises deleting an entry in the table of approved entities.

9. The method of claim 1, further comprising generating a signal which indicates that information in at least one of the approved entity table or the not-yet-approved entity table has changed.

10. A storage controller, comprising:
    at least one input/output port;
    a processor;
    a memory module communicatively connected to the processor and comprising logic instructions which, when executed, configure the processor to:
    receive a resource access request from a resource user;
    grant the resource user access to one or more resources managed by the storage controller when an identifier associated with the resource user is in a table of approved entities;
    store the identifier associated with the resource user in a table of not-yet-approved entities when the identifier associated with the resource user is not in a table of approved entities;
    transmit information from the table of not-yet-approved entities to a user interface;
    receive at least one association between a resource managed by the storage controller and a resource user;
    update at least one of the table of approved entities or the table of not-yet-approved entities to reflect the received association;
    remove an entry from the table of not-yet approved entities; and
    create an entry in the table of approved entities.

11. The storage controller of claim 10, wherein the resource access request comprises a unique identifier associated with the resource user.

12. The storage controller of claim 11, wherein:
    the resource access request includes an identifier associated with a specific resource managed by the storage controller; and
    the memory module further comprises logic instructions which, when executed by the processor, configure the processor to search a table of approved entities for an entry that matches the unique identifier associated with the resource user and includes the identifier associated with a specific resource managed by the storage controller.

13. The storage controller of claim 10, wherein the memory module further comprises logic instructions which, when executed by the processor, configure the processor to return a LUN access map to the resource user.

14. The storage controller of claim 10, wherein the table of not-yet-approved entities is stored in volatile memory.

15. The storage controller of claim 10, wherein the memory module further comprises logic instructions which, when executed by the processor, configure the processor to
transmit the information from the table of not-yet-approved entities to a management station; and
present information from the table of not-yet-approved entities on a user interface managed by the management station.

16. The storage controller of claim 15, wherein the memory module further comprises logic instructions which, when executed by the processor, configure the processor to receive a record of changes to the information from the table of not-yet-approved entities.

17. The storage controller of claim 10, wherein the memory module further comprises logic instructions which, when executed by the processor, configure the processor to delete an entry in the table of approved entities.

18. The storage controller of claim 10, further comprising wherein the memory module further comprises logic instructions which, when executed by the processor, configure the processor to generate a signal which indicates that information in at least one of the approved entity table or the not-yet-approved entity table has changed.

19. A computer program product comprising logic instructions stored on a computer-readable medium which, when executed by a processor, configure the processor to:
receive a resource access request from a resource user;
grant the resource user access to one or more resources managed by the storage controller when an identifier associated with the resource user is in a table of approved entities;
store the identifier associated with the resource user in a table of not-yet-approved entities when the identifier associated with the resource user is not in a table of approved entities;
transmit information from the table of not-yet-approved entities to a user interface;
receive at least one association between a resource managed by the storage controller and a resource user;
update at least one of the table of approved entities or the table of not-yet-approved entities to reflect the received association;
remove an entry from the table of not-yet approved entities; and
create an entry in the table of approved entities.

20. The computer program product of claim 19, wherein the memory module further comprises logic instructions which, when executed by the processor, configure the processor to return a LUN access map to the resource user.

21. The computer program product of claim 19, wherein the memory module further comprises logic instructions which, when executed by the processor, configure the processor to receive a record of changes to the information from the table of not-yet-approved entities.

22. The storage controller of claim 19, wherein the memory module further comprises logic instructions which, when executed by the processor, configure the processor to delete an entry in the table of approved entities.

23. The storage controller of claim 19, further comprising wherein the memory module further comprises logic instructions which, when executed by the processor, configure the processor to generate a signal which indicates that information in at least one of the approved entity table or the not-yet-approved entity table has changed.

* * * * *

UNITED STATES PATENT AND TRADEMARK OFFICE
CERTIFICATE OF CORRECTION

| | | |
|---|---|---|
| PATENT NO. | : 7,353,353 B2 | Page 1 of 1 |
| APPLICATION NO. | : 11/144108 | |
| DATED | : April 1, 2008 | |
| INVENTOR(S) | : James E. Pherson et al. | |

It is certified that error appears in the above-identified patent and that said Letters Patent is hereby corrected as shown below:

Title Page;
On page 2, in field (56), under "U.S. Patent Documents", in column 2, line 37,
delete "2004/0025546 A1 2/2004 Cochran" and
insert -- 2004/0022546 A1 2/2004 Cochran --, therefor.

In column 9, line 38, in Claim 1, delete "undating" and insert -- updating --, therefor.

Signed and Sealed this

Fourteenth Day of June, 2011

David J. Kappos
*Director of the United States Patent and Trademark Office*